US012663041B2

(12) United States Patent
Tsuruta

(10) Patent No.: US 12,663,041 B2
(45) Date of Patent: Jun. 23, 2026

(54) ROLLING BEARING

(71) Applicant: NIPPON THOMPSON CO., LTD.,
Tokyo (JP)

(72) Inventor: Kenichiro Tsuruta, Mino (JP)

(73) Assignee: NIPPON THOMPSON CO., LTD.,
Tokyo (JP)

( * ) Notice: Subject to any disclaimer, the term of this
patent is extended or adjusted under 35
U.S.C. 154(b) by 24 days.

(21) Appl. No.: 18/846,144

(22) PCT Filed: Mar. 28, 2022

(86) PCT No.: PCT/JP2022/015090
§ 371 (c)(1),
(2) Date: Sep. 11, 2024

(87) PCT Pub. No.: WO2023/187919
PCT Pub. Date: Oct. 5, 2023

(65) Prior Publication Data
US 2025/0188986 A1     Jun. 12, 2025

(51) Int. Cl.
F16C 19/36          (2006.01)
F16C 33/58          (2006.01)
(Continued)

(52) U.S. Cl.
CPC .......... F16C 19/362 (2013.01); F16C 33/583
(2013.01); F16C 33/588 (2013.01); **F16C
33/60 (2013.01); F16C 33/80** (2013.01)

(58) Field of Classification Search
CPC ...... F16C 19/16; F16C 19/166; F16C 19/362;
F16C 19/583; F16C 19/588; F16C 19/60;
F16C 19/80
See application file for complete search history.

(56) References Cited

U.S. PATENT DOCUMENTS 3,346,307 A    10/1967  Harrington
4,362,344 A    12/1982  Lederman
(Continued)

FOREIGN PATENT DOCUMENTS

DE           24 31 935 A1    1/1976
DE      10 2017 106 195 B3    6/2018
(Continued)

OTHER PUBLICATIONS

Apr. 14, 2025 extended Search Report issued in European Patent
Application No. 22935072.3.

*Primary Examiner* — Phillip A Johnson
(74) *Attorney, Agent, or Firm* — Oliff PLC

(57) ABSTRACT

A rolling bearing includes outer and inner steel rings made
of steel and rolling elements respectively rollable on inner
and outer circumferential surfaces of the outer and inner
rings. The outer ring includes first and second outer rings.
The inner ring includes first and second inner rings. The first
and second outer rings and the first and second inner rings
include first, second, and third portions. The first portion is
a disk annular portion orthogonally extending relative to the
first axis direction. The second portion is connected to the
first portion and has a circumferential surface constituting an
annular rolling surface. The third portion is connected to the
second portion and includes a tubular portion extending
along the first axis direction. The first and second inner ring
third portions have end surfaces spaced from and opposed to
inner circumferential surfaces of the first and second outer
ring third portions, respectively.

7 Claims, 4 Drawing Sheets

(51) Int. Cl.
  *F16C 33/60*  (2006.01)
  *F16C 33/80*  (2006.01)

(56)     References Cited

U.S. PATENT DOCUMENTS

| | | | |
|---|---|---|---|
| 4,368,932 A * | 1/1983 | Wolzenburg | F16C 33/7886 |
| | | | 384/607 |
| 4,722,616 A | 2/1988 | Lederman | |
| 10,851,837 B2 | 12/2020 | Tsuruta et al. | |
| 2019/0316633 A1 | 10/2019 | Tsuruta et al. | |
| 2022/0332144 A1 | 10/2022 | Tsuruta | |
| 2022/0333639 A1 | 10/2022 | Tsuruta | |

FOREIGN PATENT DOCUMENTS

| | | | | |
|---|---|---|---|---|
| GB | 1 326 070 A | 8/1973 | | |
| JP | 2019-178735 A | 10/2019 | | |
| JP | 2021-054195 A | 4/2021 | | |
| JP | 2021-055719 A | 4/2021 | | |
| JP | 2022-048250 A | 3/2022 | | |
| WO | WO-2021059961 A1 * | 4/2021 | ............. | F16C 33/62 |

* cited by examiner

ROLLING BEARING

TECHNICAL FIELD

The present invention relates to a rolling bearing.

BACKGROUND ART

A rolling bearing in which an outer ring and an inner ring are each composed of a pair of sheet members is known (see, for example, Patent Literature 1). A rolling bearing having an outer ring and an inner ring each composed of a pair of sheet members and a seal provided between the outer ring and the inner ring is known (see, for example, Patent Literature 2).

CITATION LIST

Patent Literature

Patent Literature 1: Japanese Patent Application Laid-Open No. 2019-178735
Patent Literature 2: Japanese Patent Application Laid-Open No. 2021-55719

SUMMARY OF INVENTION

Technical Problem

There is a need for thin and easy-to-handle rolling bearings. Therefore, one of the objects is to provide a rolling bearing that is thin and easy to handle.

Solution to Problem

A rolling bearing according to the present disclosure includes: an outer ring made of steel; an inner ring made of steel having a common central axis with the outer ring and arranged on an inner circumferential side of the outer ring; and a plurality of rolling elements arranged so as to be rollable on an inner circumferential surface of the outer ring and an outer circumferential surface of the inner ring. The outer ring includes a first outer ring, and a second outer ring arranged alongside the first outer ring in a first axis direction in which the central axis extends and fixed to the first outer ring. The inner ring includes a first inner ring, and a second inner ring arranged alongside the first inner ring in the first axis direction and fixed to the first inner ring. The first outer ring, the second outer ring, the first inner ring, and the second inner ring each include a first portion, a second portion, and a third portion. The first portion is a disk annular portion extending in a direction orthogonal to the first axis direction. The second portion is connected to the first portion and has a circumferential surface constituting an annular rolling surface. The third portion is connected to the second portion and includes a tubular portion extending along the first axis direction. The third portions of the first inner ring and the second inner ring have end surfaces spaced from and opposed to inner circumferential surfaces of the third portions of the first outer ring and the second outer ring, respectively.

Advantageous Effects of Invention

According to the rolling bearing described above, a rolling bearing that is thin and easy to handle is provided.

DESCRIPTION OF EMBODIMENTS

Outline of Embodiments

Figure 1:
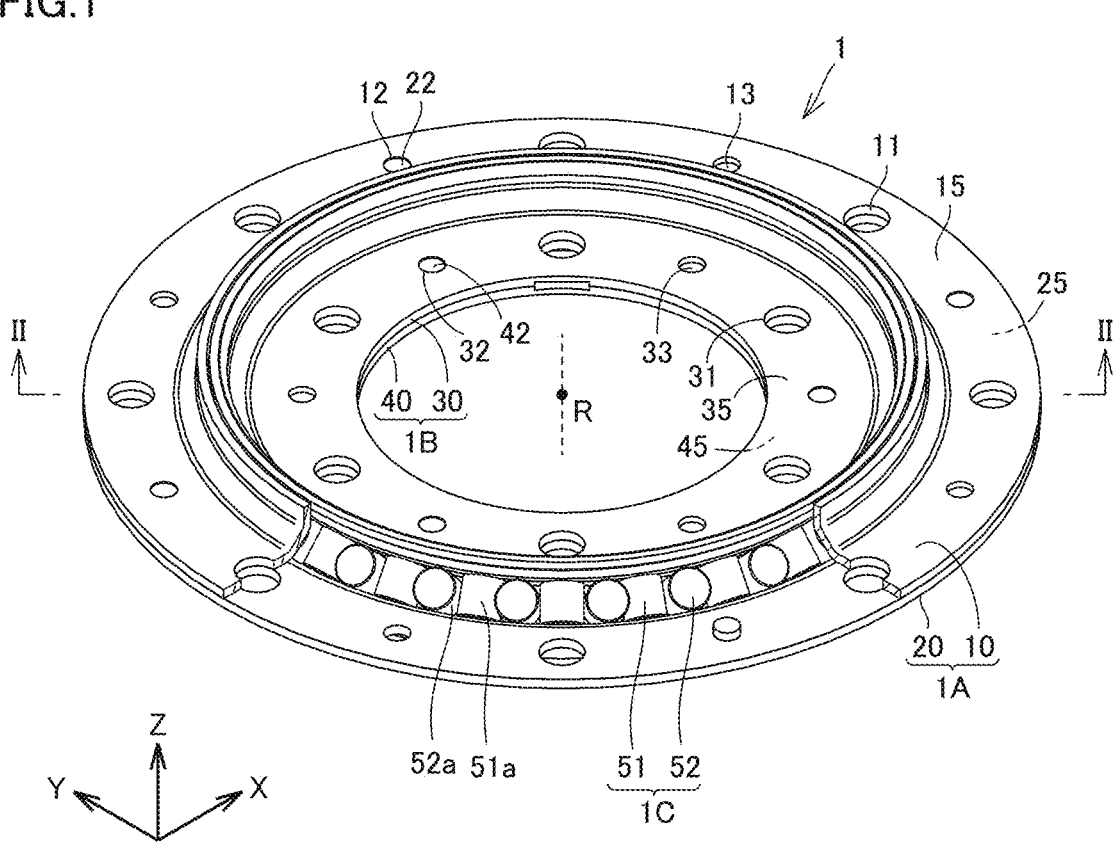
FIG. 1 is a schematic perspective view showing the structure of a rolling bearing according to the present disclosure.

Firstly, embodiments of the present disclosure will be listed and described. A rolling bearing according to the present disclosure includes: an outer ring made of steel; an inner ring made of steel having a common central axis with the outer ring and arranged on an inner circumferential side of the outer ring; and a plurality of rolling elements arranged so as to be rollable on an inner circumferential surface of the outer ring and an outer circumferential surface of the inner ring. The outer ring includes a first outer ring, and a second outer ring arranged alongside the first outer ring in a first axis direction in which the central axis extends and fixed to the first outer ring. The inner ring includes a first inner ring, and a second inner ring arranged alongside the first inner ring in the first axis direction and fixed to the first inner ring. The first outer ring, the second outer ring, the first inner ring, and the second inner ring each include a first portion, a second portion, and a third portion. The first portion is a disk annular portion extending in a direction orthogonal to the first axis direction. The second portion is connected to the first portion and has a circumferential surface constituting an annular rolling surface. The third portion is connected to the second portion and includes a tubular portion extending along the first axis direction. The third portions of the first inner ring and the second inner ring have end surfaces spaced from and opposed to inner circumferential surfaces of the third portions of the first outer ring and the second outer ring, respectively.

Conventionally, a thin-type rolling bearing disclosed in Patent Literature 1 is known. In the rolling bearing disclosed in Patent Literature 1, the outer ring and the inner ring are each composed of a pair of members divided in the axial direction (also referred to as split rings of the outer ring and split rings of the inner ring). Patent Literature 1 discloses that in the rolling bearing, the split rings of the outer ring and the split rings of the inner ring each have a flange portion extending in the axial direction. It also describes that the flange portion may have a labyrinth portion at a tip end thereof. The labyrinth portions formed in the split rings of either the outer ring or the inner ring extend so as to cover the end surfaces of the split rings of the other of the outer ring and the inner ring.

The rolling bearing of Patent Literature 2, as in Patent Literature 1, includes an outer ring composed of split rings of the outer ring assembled together and an inner ring composed of split rings of the inner ring assembled together. The split rings of the outer ring and the split rings of the inner ring each have a flange portion extending in the axial direction. Seals are provided between the flange portions of the split rings of the outer ring and the flange portions of the split rings of the inner ring to seal between the outer ring and the inner ring.

The above rolling bearings can be bearings with small dimensions in the axial direction, i.e., thin bearings. They can be fabricated by pressing steel sheets. However, there is a need for further reduction in dimensions in the axial direction. In addition, considering the ease of handling of a rolling bearing, it is preferable to be able to check the inside of the bearing even during production and use.

Under the above-described circumstances, studies were conducted and the rolling bearing of the present disclosure was conceived. In the rolling bearing according to the present disclosure, the outer ring includes a first outer ring and a second outer ring, and the inner ring includes a first inner ring and a second inner ring. The first outer ring, the second outer ring, the first inner ring, and the second inner ring each have a tubular portion (flange portion) extending in the axial direction. The end surfaces of the tubular portions of the first inner ring and the second inner ring are spaced from and opposed to the inner circumferential surfaces of the third portions of the first outer ring and the second outer ring, respectively.

In the rolling bearings disclosed in Patent Literatures 1 and 2, the flange portions of the inner ring and the outer ring both extend along the axial direction, and their end surfaces are perpendicular to the axial direction. In the case where a labyrinth portion is provided at a tip end of a flange portion, the labyrinth portion is formed axially outward of the flange portion so as to cover the end surface of the flange portion. In contrast, in the rolling bearing according to the present disclosure, the flange portions of the inner ring have their ends bent radially outward so that the end surfaces of the flange portions of the inner ring are opposed to the inner circumferential surfaces of the outer ring. In the axial direction, the tip ends of the flange portions of the inner ring do not project outward from the flange portions of the outer ring. With this configuration, the dimensions in the axial direction can be suppressed compared to the case where the labyrinth portions are provided, and at the same time, the gaps formed between the outer ring and the inner ring at the flange portions can be made small. It is therefore possible to prevent foreign material and dust from entering the raceway even without the labyrinth portions.

The rolling bearing according to the present disclosure allows visual observation of the inside through the gaps formed between the outer ring and the inner ring. With this configuration, the conditions of the rolling elements and the inside of the raceway can be checked from the outside even during production and use. For example, during production, it can be confirmed that a predetermined number of rolling elements have been inserted in predetermined directions. During use, it can be checked whether grease has been injected properly and, if necessary, grease can be injected into the raceway through the gaps between the outer ring and the inner ring.

In the above rolling bearing, an end surface in the first axis direction of the rolling bearing may be composed of end surfaces of the third portions of the first outer ring and the second outer ring and main surfaces of the first inner ring and the second inner ring. According to this configuration, the gaps formed between the outer ring and the inner ring can be made small while suppressing the dimensions in the axial direction of the rolling bearing. As used herein, the "main surface" means a main surface (which is not an end surface and has a largest area) of a sheet material constituting an inner ring.

In the above rolling bearing, the rolling elements may be rollers. The second portion of each of the first outer ring, the second outer ring, the first inner ring, and the second inner ring may be a tubular portion of a truncated cone shape having a diameter that increases toward an outside in a radial direction of the rolling bearing. The rolling bearing according to the present disclosure may be produced by performing press working on steel sheets. When the rolling elements are rollers, the rolling surfaces can be formed as flat surfaces, so working is easier than in the case where the rolling elements are balls. Accordingly, a thin and easy-to-handle rolling bearing can be produced more reliably, and also reasonably by applying the known technology.

The first outer ring, the second outer ring, the first inner ring, and the second inner ring may each be composed of a single sheet material having a constant sheet thickness. The rolling bearing with such a configuration can be produced by performing press working on steel sheets. In particular, the configuration in which the flange portions of the split rings of the inner ring have their ends bent in an outside diameter direction can be reliably fabricated by press working. Therefore, a thin and easy-to-handle rolling bearing can be produced stably at a reasonable cost.

Specific Embodiment

A specific embodiment of the rolling bearing of the present disclosure will be described below with reference to the drawings. In the drawings referenced below, the same or corresponding portions are denoted by the same reference numerals and the description thereof will not be repeated.

FIG. 1 is a schematic perspective view showing the structure of a rolling bearing 1 according to the present disclosure. In the figure, the bearing is partially cut open to show the interior. The Z axis in FIG. 1 is along a direction in which a central axis R of the rolling bearing 1 extends. Herein, the Z axis direction is also referred to as the thickness direction of the rolling bearing or the axial direction. The XY plane in FIG. 1 is a plane along the radial and circumferential directions of the rolling bearing.

An overall configuration of the rolling bearing 1 will be described with reference to FIG. 1. The rolling bearing 1 includes an outer ring 1A, an inner ring 1B, and rollers 1C as a plurality of rolling elements. The outer ring 1A and the inner ring 1B have a common central axis R. The outer ring 1A and the inner ring 1B are made of steel. The inner ring 1B is arranged on the inner circumferential side of the outer ring 1A. The outer ring 1A and the inner ring 1B are formed from steel sheets worked into predetermined shapes. The steel constituting the outer ring 1A and the inner ring 1B is, for example, SCM415 specified in JIS standard.

Referring to FIG. 1, the outer ring 1A includes a generally annular first outer ring 10 and a generally annular second outer ring 20. The first outer ring 10 and the second outer ring 20 have the same shape as each other. The first outer ring 10 and the second outer ring 20 are arranged side by side in a direction of the central axis R as a first axis. The first outer ring 10 and the second outer ring 20 are fixed to each other.

The inner ring 1B includes a generally annular first inner ring 30 and a generally annular second inner ring 40. The first inner ring 30 and the second inner ring 40 have the same shape as each other. The first inner ring 30 and the second inner ring 40 are arranged side by side in the direction of the central axis R. The first inner ring 30 and the second inner ring 40 are fixed to each other.

A plurality of rollers 1C are arranged in an annular raceway composed of an inner circumferential surface of the outer ring 1A and an outer circumferential surface of the inner ring 1B. The rollers 1C include a plurality of first rollers 51 and a plurality of second rollers 52. The first rollers 51 and the second rollers 52 are alternately arranged in a circumferential direction. The first rollers 51 and the second rollers 52 have a columnar shape. The first rollers 51 and the second rollers 52 are made of the same material and have the same dimensions, differing only in the direction of arrangement. A first roller 51 has a cylindrical outer circumferential surface 51a and circular end surfaces at both ends of the outer circumferential surface 51a. A second roller 52 has a cylindrical outer circumferential surface 52a and circular end surfaces at both ends of the outer circumferential surface 52a. The first rollers 51 and the second rollers 52 are made of steel. The first rollers 51 and the second rollers 52 are made of, for example, SUJ2 specified in JIS standard.

Although the specific dimensions of the rolling bearing 1 are not particularly limited as long as they provide the advantageous effects of the present disclosure, typically, the outer ring may have an outside diameter of about 30 mm to about 150 mm, and the inner ring may have an inside diameter of about 0 mm to about 120 mm. The thickness in the axial direction may be about 4 mm to about 15 mm. The rolling bearing according to the present disclosure is a rolling bearing with suppressed dimensions in the axial direction, also referred to as an ultra-thin type.

The first outer ring 10 has a first portion 15 extending in a direction orthogonal to the central axis R. The second outer ring 20 has a first portion 25 extending in a direction orthogonal to the central axis R. The first portions 15 and 25 are disk annular portions. The first portion 15 has a common central axis with the central axis R. The first portions 15 and 25 have a plurality of (in the first embodiment, six) mounting holes 11, penetrating in the thickness direction (direction of the central axis R), formed at equal intervals in the circumferential direction. When fixing the rolling bearing 1 to an external member, bolts can be inserted into the mounting holes 11 and the bolts can be screwed into threaded holes of the external member, thereby fixing the rolling bearing 1.

In the first portion 15, a through hole 12 and a protruding portion 13 are alternately formed between adjacent mounting holes 11. The through hole 12 has a protruding portion 22 of the second outer ring 20 fitted therein. The protruding portion 13 is fitted into a through hole 23 (FIG. 4) formed in the second outer ring 20. The fitted portions may be bonded with an adhesive. The first outer ring 10 and the second outer ring 20 are fixed to each other by this configuration. The manner of fixing the first outer ring 10 to the second outer ring 20 is not limited thereto, and they may be fixed using, for example, screws.

The first inner ring 30 has a first portion 35 extending in a direction orthogonal to the central axis R. The second inner ring 40 has a first portion 45 extending in a direction orthogonal to the central axis R. The first portions 35 and 45 are disk annular portions. The first portions 35 and 45 have a plurality of (in the first embodiment, six) mounting holes 31, penetrating in the thickness direction (direction of the central axis R), formed at equal intervals in the circumferential direction. When fixing the rolling bearing 1 to an external member, bolts can be inserted into the mounting holes 31 and the bolts can be screwed into threaded holes of the external member, thereby fixing the rolling bearing 1.

In the first portion 35, a through hole 32 and a protruding portion 33 are alternately formed between adjacent mounting holes 31. The through hole 32 has a protruding portion 42 of the second inner ring 40 fitted therein. The protruding portion 33 is fitted into a through hole 43 (FIG. 6) formed in the second inner ring 40. The fitted portions may be bonded with an adhesive. The first inner ring 30 and the second inner ring 40 are fixed to each other by this configuration. The manner of fixing the first inner ring 30 to the second inner ring 40 is not limited thereto, and they may be fixed using, for example, screws.

Figure 2:
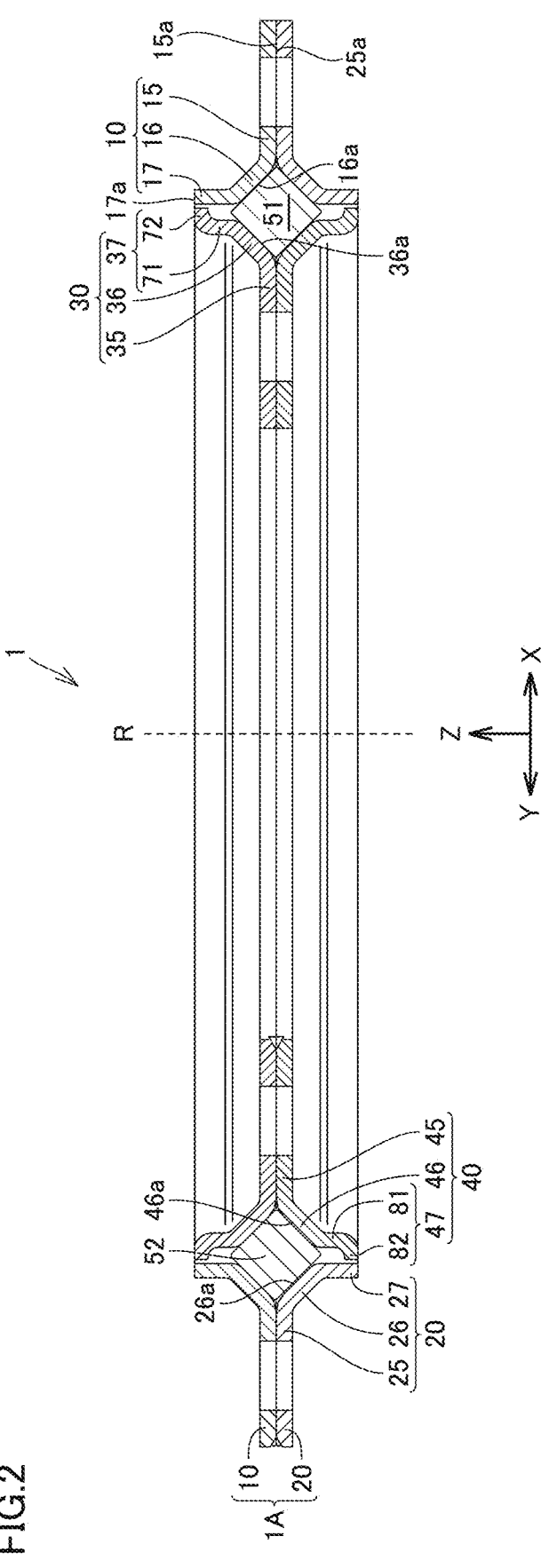
FIG. 2 is a cross-sectional view when cut along II-II in FIG. 1.

FIG. 2 is a cross-sectional view when cut along II-II in FIG. 1. The outer ring 1A and the inner ring 1B will now be further described with reference to FIG. 2.

The first outer ring 10 includes the first portion 15, a second portion 16, and a third portion 17. The first portion 15, the second portion 16, and the third portion 17 are approximately equal in thickness. The third portion 17 may be slightly thinner than the first portion 15 (by, for example, about 0.1 mm to about 0.3 mm). The first portion 15 may be thicker than the second portion 16 and the third portion 17. The first portion 15 has a disk annular shape. The second portion 16 has a tubular shape. The second portion 16 has an outer shape of truncated cone shape. The second portion 16 extends from an inner edge of the first portion 15 such that its inside diameter decreases with increasing distance from the first portion 15 in the Z axis direction. In other words, the second portion 16 has a diameter that increases toward the outside in the radial direction of the rolling bearing 1. The second portion 16 has an annular inner circumferential surface 16a. The inner circumferential surface 16a constitutes a rolling surface on which the first rollers 51 roll. The inner circumferential surface 16a has a common central axis with the central axis R of the rolling bearing 1. The third portion 17 has a cylindrical shape. The third portion 17 has a common central axis with the central axis R of the rolling bearing 1. The third portion 17 is connected to an end of the second portion 16 opposite the first portion 15 in the Z axis direction and extends along the Z axis direction. The third portion 17 has an end surface 17a that is orthogonal to the central axis R.

Similarly, the second outer ring 20 includes the first portion 25, a second portion 26, and a third portion 27. The second outer ring 20 has the same dimensions and shape as the first outer ring 10, differing only in the direction of arrangement. The first portion 25 has the same configuration as the first portion 15. The second portion 26 has the same configuration as the second portion 16. The third portion 27 has the same configuration as the third portion 17. The second portion 26 is arranged to extend opposite the second portion 16 of the first outer ring 10 in the Z axis direction. The second portion 26 has an annular inner circumferential surface 26a. The inner circumferential surface 26a constitutes a rolling surface on which the second rollers 52 roll. The third portion 27 is connected to an end of the second portion 26 opposite the first portion 25 in the Z axis direction and extends opposite the third portion 17 along the Z axis direction.

The first outer ring 10 and the second outer ring 20 are opposed and fixed to each other at a main surface 15a of the first portion 15 in the first outer ring 10 and a main surface 25a of the first portion 25 in the second outer ring 20.

The inner ring 1B includes the annular first inner ring 30 and the annular second inner ring 40. The first inner ring 30 and the second inner ring 40 have the same dimensions and shape, differing only in the direction of arrangement.

The first inner ring 30 includes the first portion 35, a second portion 36, and a third portion 37. The first portion 35, the second portion 36, and the third portion 37 are approximately equal in thicknesses. The third portion 37 may be slightly thinner than the first portion 35 (by, for example, about 0.1 mm to about 0.3 mm). The first portion 35 may be thicker than the second portion 36 and the third portion 37. The thickness of the first inner ring 30 coincides with the thickness of the first outer ring 10. The first portion 35 has a disk annular shape. The first portion 35 has a common central axis with the central axis R of the rolling bearing 1. The second portion 36 has a tubular shape. The second portion 36 has an outer shape of truncated cone shape. The second portion 36 extends from an outer edge of the first portion 35 such that its outside diameter increases with increasing distance from the first portion 35 in the Z axis direction. In other words, the second portion 36 has a diameter that increases toward the outside in the radial direction of the rolling bearing 1.

The second portion 36 has an annular outer circumferential surface 36a. The outer circumferential surface 36a constitutes a rolling surface on which the second rollers 52 roll. The outer circumferential surface 36a has a common central axis with the central axis R of the rolling bearing 1. The third portion 37 has a cylindrical shape. The third portion 37 has a common central axis with the central axis R of the rolling bearing 1. The third portion 37 is connected to an end of the second portion 36 opposite the first portion 35 in the Z axis direction. The third portion 37 includes a cylindrical portion 71 and a tip end 72. The cylindrical portion 71 is a tubular portion extending along the Z axis direction. The tip end 72 is a portion continuous with one end of the cylindrical portion 71 and extending radially outward of the rolling bearing 1 from the distal end of the cylindrical portion 71.

Similarly, the second inner ring 40 includes the first portion 45, a second portion 46, and a third portion 47. The second inner ring 40 has the same dimensions and shape as the first inner ring 30, differing only in the direction of arrangement. The first portion 45 has the same configuration as the first portion 35. The second portion 46 has the same configuration as the second portion 36. The third portion 47 has the same configuration as the third portion 37. The second portion 46 is arranged to extend opposite the second portion 36 of the first inner ring 30 in the Z axis direction. The second portion 46 has an annular outer circumferential surface 46a. The outer circumferential surface 46a constitutes a rolling surface on which the first rollers 51 roll. The third portion 47 is connected to an end of the second portion 46 opposite the first portion 45 in the Z axis direction, and extends opposite the third portion 37 along the Z axis direction. The third portion 47 includes a cylindrical portion 81 and a tip end 82. The cylindrical portion 81 is a tubular portion extending along the Z axis direction. The tip end 82 is a portion continuous with one end of the cylindrical portion 81 and extending radially outward of the rolling bearing 1 from the distal end of the cylindrical portion 81.

Figure 3:
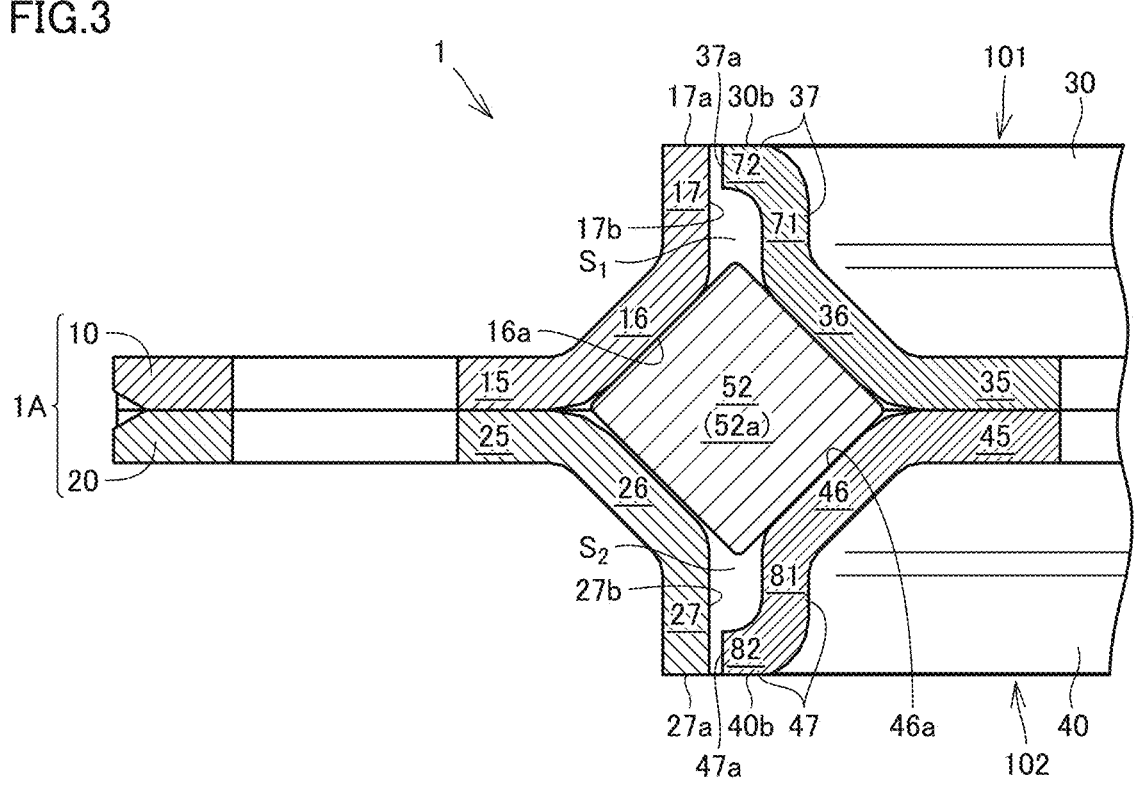
FIG. 3 is a partially enlarged cross-sectional view showing an enlarged portion of FIG. 2.

FIG. 3 is a partially enlarged cross-sectional view showing an enlarged portion of FIG. 2. Referring to FIG. 3, the third portion 37 of the first inner ring 30 has an end surface 37a spaced from and opposed to an inner circumferential surface 17b of the third portion 17 of the first outer ring 10. The spacing between the inner circumferential surface 17b and the end surface 37a, although not particularly limited, can be about 0.1 mm to about 0.6 mm, for example. Similarly, the third portion 47 of the second inner ring 40 has an end surface 47a spaced from and opposed to an inner circumferential surface 27b of the third portion 27 of the second outer ring 20. The spacing between the inner circumferential surface 27b and the end surface 47a can be the same as the spacing between the inner circumferential surface 17b and the end surface 37a.

A space $S_1$ is formed between the third portion 17 of the first outer ring 10 and the third portion 37 of the first inner ring 30 to communicate with the outside. According to the configuration of the present disclosure, the space $S_1$ is narrower at an outer end in the axial direction, i.e., near the entrance. The presence of a spacing between the first outer ring 10 and the first inner ring 30 makes it possible to check the inside of the raceway of the bearing from the outside and to inject grease. At the same time, the narrowed entrance area can suppress the entry of foreign material and dust. Similarly, a space $S_2$ is formed between the third portion 27 of the second outer ring 20 and the third portion 47 of the second inner ring 40.

When the rolling bearing 1 is viewed as a whole, an end surface 101 in the axial direction of the rolling bearing 1 is composed of the end surface 17a of the third portion 17 of the first outer ring 10 and a main surface 30b of the steel sheet constituting the first inner ring 30. In other words, the end surface 17a and the main surface 30b are configured to be at the same height in the axial direction. Similarly, an end surface 102 in the axial direction of the rolling bearing 1 is composed of an end surface 27a of the third portion 27 of the second outer ring 20 and a main surface 40b of the steel sheet constituting the second inner ring 40. In other words, the end surface 27a and the main surface 40b are configured to be at the same height in the axial direction. As used herein, the "main surface" means one of the surfaces of the steel sheet constituting an inner ring that is not an end surface and has a largest area.

An example of the method of producing the rolling bearing according to the present disclosure will now be described.

Figure 4:
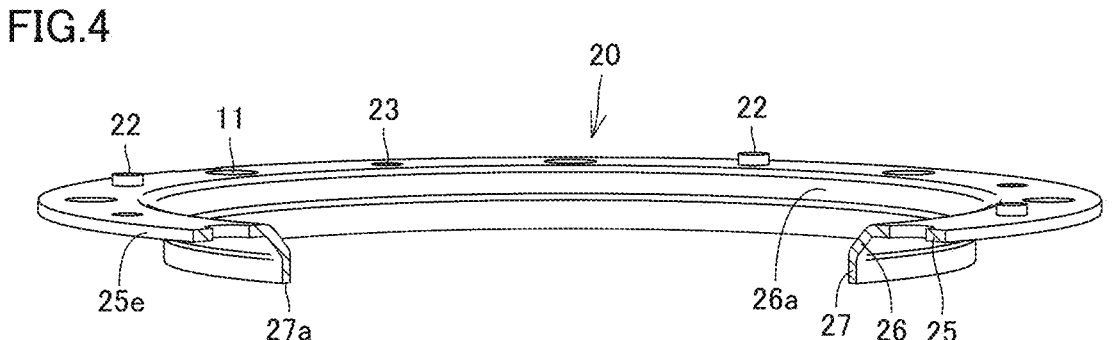
FIG. 4 is a partial cross-sectional perspective view of a second outer ring taken out and partially cut away.

The rolling bearing according to the present disclosure can be produced by subjecting steel sheets having a constant thickness to progressive press working. FIG. 4 is a partial cross-sectional perspective view of the second outer ring 20 taken out and partially cut away. Referring to FIG. 4, the second outer ring 20 is fabricated by bending a continuous sheet material into a predetermined shape, cutting and forming a predetermined portion, and then cutting the formed portion from the sheet material. For example, the sheet material is subjected to drawing to form a raised portion and a bottom portion from which the second portion 26 and later the third portion 27 are formed. A portion of the raised portion becomes the second portion 26. The bottom portion is then cut to open a hole. The cut portion is burred to form the third portion 27. Finally, the sheet material is cut at a predetermined location to separate the formed portion. The end surface of the separated portion becomes an end surface 25e of the first portion 25. During the above process, the mounting holes 11, the protruding portions 22, and the through holes 23 are formed. If necessary, the inner circumferential surface 26a of the second portion, which becomes a rolling surface, may be adjusted to a predetermined shape by grinding or the like. The first outer ring 10 and the second outer ring 20 are produced without any distinction between them. From a large number of outer ring members produced, two members are arbitrarily or selectively combined into a pair, and fixed to each other to constitute the outer ring 1A.

Figure 5:
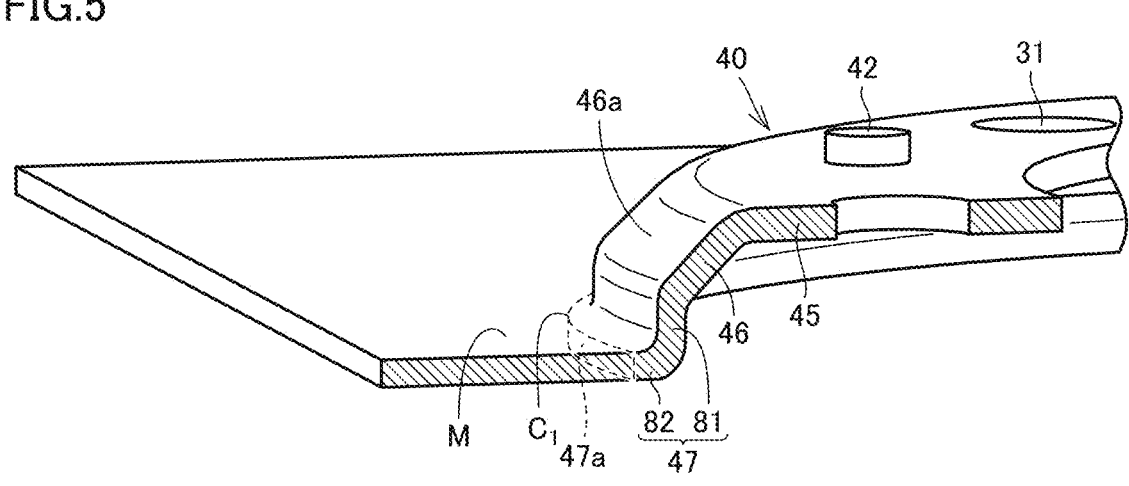
FIG. 5 is a cross-sectional perspective view showing part of the process of fabricating an inner ring.
Figure 6:
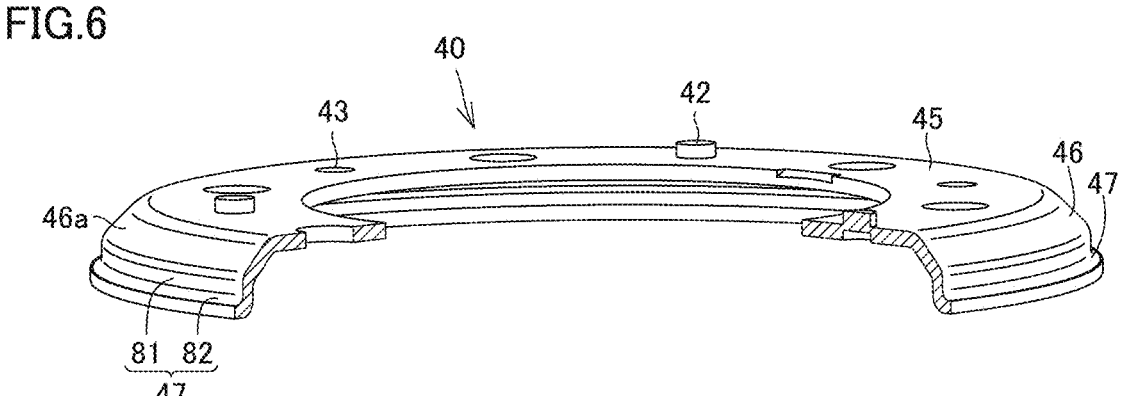
FIG. 6 is a partial cross-sectional perspective view of a second inner ring taken out and partially cut away.

FIG. 5 is a cross-sectional perspective view schematically showing part of the process of fabricating the second inner ring 40. FIG. 6 is a partial cross-sectional perspective view of the second inner ring 40 taken out and partially cut away. Referring to FIGS. 5 and 6, the second inner ring 40 can also be produced by subjecting a steel sheet having a constant thickness to progressive press working. The second inner ring 40 is fabricated by slitting the sheet material, forming a raised portion by drawing, then cutting a predetermined portion, and finally cutting the formed portion from the sheet material. Referring to FIG. 5, a sheet material M is subjected to drawing to form the cylindrical portion 81 rising from the sheet material M, the second portion 46 extending diagonally from the cylindrical portion 81, and the first portion 45 corresponding to the bottom surface of the drawing. The mounting holes 31, the protruding portions 42, and the through holes 43 may be formed at the same time, or in preceding or succeeding steps. Finally, the second inner ring 40 is separated from the sheet material M. At this time, the sheet material M is cut at a position c1 away from the cylindrical portion 81 in the outside diameter direction. By cutting the sheet material M at the position c1, the tip end 82 is formed. The end surface of the separated portion becomes the end surface 47a of the third portion 47.

In the second inner ring 40, the outer circumferential surface 46a of the second portion 46 becomes a rolling surface. Cutting the sheet material M to form the tip end 82 can prevent distortion of the outer circumferential surface 46a due to stress at the time of cutting. In addition, by cutting at a position at a certain distance from the cylindrical portion 81, cutting becomes easier, and a bearing member with high roundness and stable quality can be produced. The second inner ring 40 can be stably produced by progressive pressing working with high production efficiency, and with the shape of the flange portion having its end bent in the outside diameter direction, a rolling bearing that is thin and easy to handle is realized. If necessary, in a subsequent step, the outer circumferential surface 46a, which becomes the rolling surface, may be adjusted to a predetermined shape by grinding or the like. The second inner ring 40 and the first inner ring 30 are produced without any distinction between them. From a large number of inner ring members produced, two members are arbitrarily or selectively combined into a pair, and fixed to each other to constitute the inner ring 1B.

In assembling the bearing, for example, the inner ring 1B and the second outer ring 20 are combined, and then the rollers are arranged in predetermined directions. After all the rollers are arranged, the first outer ring 10 is combined and fixed. Of course, during the sequence of production steps, grinding, quenching, and other known steps may be performed as needed.

Modifications

While the rolling elements in the rolling bearing are rollers in the above example, the rolling elements may be balls. Separators may be placed between the rolling elements. The rolling elements may be held in a retainer. Furthermore, the rolling bearing according to the present disclosure may include a configuration for securely fixing between the first outer ring and the second outer ring and/or a configuration for securely fixing between the first inner ring and the second inner ring. For example, an adhesive layer may be provided between the opposing surfaces of the outer rings and/or the inner rings, or a recess may be formed in which the adhesive can collect. Alternatively, the outer rings and/or the inner rings may be fastened to each other with screws for thin sheets or the like.

It should be understood that the embodiment disclosed herein is illustrative and non-restrictive in every respect. The scope of the present invention is defined by the terms of the claims, rather than the description above, and is intended to include any modifications within the scope and meaning equivalent to the terms of the claims.

REFERENCE SIGNS LIST

1: rolling bearing; 1A: outer ring; 1B: inner ring; 1C: roller; 10: first outer ring; 11, 31: mounting hole; 12, 23, 43: through hole; 13, 22, 42: protruding portion; 15, 25, 35, 45: first portion; 15a, 25a, 30b, 40b: main surface; 16, 26, 36, 46: second portion; 16a, 26a: inner circumferential surface; 17, 27, 37, 47: third portion; 17a, 27a, 37a, 47a: end surface; 17b, 27b: inner circumferential surface; 20: second outer ring; 25e end surface; 30: first inner ring; 36a, 46a: outer circumferential surface; 40: second inner ring; 51: first roller; 51a, 52a: outer circumferential surface; 51B, 51C, 52B, 52C: end surface; 52: second roller; 71, 81: cylindrical portion; 72, 82: tip end; 101: end surface; M: sheet material; R: central axis; and $S_1$, $S_2$: space.

The invention claimed is:

1. A rolling bearing comprising:

an outer ring made of steel;

an inner ring made of steel having a common central axis with the outer ring and arranged on an inner circumferential side of the outer ring; and a plurality of rolling elements arranged so as to be rollable on an inner circumferential surface of the outer ring and an outer circumferential surface of the inner ring;

the outer ring including a first outer ring, and a second outer ring arranged alongside the first outer ring in a first axis direction in which the central axis extends and fixed to the first outer ring, the inner ring including a first inner ring, and a second inner ring arranged alongside the first inner ring in the first axis direction and fixed to the first inner ring, the first outer ring, the second outer ring, the first inner ring, and the second inner ring each including a first portion which is a disk annular portion extending in a direction orthogonal to the first axis direction, a second portion connected to the first portion and having a circumferential surface constituting an annular rolling surface, and a third portion connected to the second portion and including a tubular portion extending along the first axis direction, the third portions of the first inner ring and the second inner ring having end surfaces spaced from and opposed to inner circumferential surfaces of the tubular portions of the third portions of the first outer ring and the second outer ring, respectively.

2. The rolling bearing according to claim 1, wherein an end surface in the first axis direction of the rolling bearing is composed of end surfaces of the third portions of the first outer ring and the second outer ring, and main surfaces of the first inner ring and the second inner ring.

3. The rolling bearing according to claim 2, wherein the rolling elements are rollers, and the second portion of each of the first outer ring, the second outer ring, the first inner ring, and the second inner ring is a tubular portion of a truncated cone shape having a diameter that increases toward an outside in a radial direction of the rolling bearing.

4. The rolling bearing according to claim 2, wherein the first outer ring, the second outer ring, the first inner ring, and the second inner ring are each formed from a single sheet material having a constant sheet thickness.

5. The rolling bearing according to claim 1, wherein the rolling elements are rollers, and the second portion of each of the first outer ring, the second outer ring, the first inner ring, and the second inner ring is a tubular portion of a truncated cone shape having a diameter that increases toward an outside in a radial direction of the rolling bearing.

6. The rolling bearing according to claim 5, wherein the first outer ring, the second outer ring, the first inner ring, and the second inner ring are each formed from a single sheet material having a constant sheet thickness.

7. The rolling bearing according to claim 1, wherein the first outer ring, the second outer ring, the first inner ring, and the second inner ring are each formed from a single sheet material having a constant sheet thickness.

* * * * *